(12) United States Patent
Gopalakrishnan et al.

(10) Patent No.: US 6,987,729 B1
(45) Date of Patent: Jan. 17, 2006

(54) METHOD AND APPARATUS FOR ADMISSION MANAGEMENT IN WIRELESS COMMUNICATION SYSTEMS

(75) Inventors: Nandu Gopalakrishnan, Chatham, NJ (US); Teck H. Hu, Budd Lake, NJ (US); Ashok N. Rudrapatna, Basking Ridge, NJ (US); Pengfei Zhu, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/569,911

(22) Filed: May 11, 2000

Related U.S. Application Data (63) Continuation-in-part of application No. 09/568,921, filed on May 11, 2000, now Pat. No. 6,519,462.

(51) Int. Cl.
*G08C 15/00* (2006.01)

(52) U.S. Cl. .......................... 370/230; 370/437
(58) Field of Classification Search ................ 370/230, 370/332, 333, 431, 437
See application file for complete search history.

(56) References Cited

U.S. PATENT DOCUMENTS

| | | | | |
|---|---|---|---|---|
| 5,274,644 A | * | 12/1993 | Berger et al. | 370/230 |
| 5,673,259 A | * | 9/1997 | Quick, Jr. | 370/342 |
| 5,828,672 A | * | 10/1998 | Labonte et al. | 714/708 |
| 5,844,894 A | * | 12/1998 | Dent | 370/330 |
| 5,956,327 A | * | 9/1999 | Faerber et al. | 370/330 |
| 6,061,339 A | * | 5/2000 | Nieczyporowicz et al. | 370/335 |
| 6,163,699 A | * | 12/2000 | Naor et al. | 455/453 |
| 6,169,728 B1 | * | 1/2001 | Perreault et al. | 370/235 |
| 6,278,701 B1 | * | 8/2001 | Ayyagari et al. | 370/335 |
| 6,493,331 B1 | * | 12/2002 | Walton et al. | 370/341 |
| 6,519,462 B1 | * | 2/2003 | Lu et al. | 455/453 |
| 6,549,515 B1 | * | 4/2003 | Sourani et al. | 370/232 |
| 6,597,705 B1 | * | 7/2003 | Rezaiifar et al. | 370/468 |

FOREIGN PATENT DOCUMENTS

| | | |
|---|---|---|
| WO | WO 9405098 A1 * | 3/1994 |
| WO | WO 9406222 A1 * | 3/1994 |

OTHER PUBLICATIONS

Anderson, H.R. "Simulations of Channel Capacity and Frequency Reuse in Multipoint LMDS Systems". Radio and Wireless Conference, 1999. RAWCON 99. Denver, CO. Aug. 1-4, 1999. pp. 9-12.*

Chi-Chun, Lo. "QoS Provisioning in Handoff Algorithms for Wireless LAN". Internationl Zurich Seminar on Broadband Communications, 1998. Accessing, Transmission, Networking. Zurich, Switzerland. Feb. 17-19, 1998. pp. 9-16.*

* cited by examiner

*Primary Examiner*—John Pezzlo
*Assistant Examiner*—Donald L Mills (57) ABSTRACT

A method and apparatus are provided for dynamically controlling a high speed wireless communication system to optimize utilization of system resources and increase system throughput. The invention operates to determine an allocation of wireless transmission resources to each user application served by the wireless system in a manner to optimize transmission resources while meeting required QoS criteria for the served user application. After all user applications have been provided a transmission resource allocation in this manner, the total transmission resources so allocated are determined and compared with a ceiling transmission resource level for the wireless system. A portion of the difference between the ceiling and currently allocated transmission resource levels is then made available, according to the invention, to the served user applications in proportion to the initial allocation provided each user application. An admission control methodology is also provided which is implemented in a cooperative relationship with the further resource allocation process of the invention.

17 Claims, 3 Drawing Sheets

METHOD AND APPARATUS FOR ADMISSION MANAGEMENT IN WIRELESS COMMUNICATION SYSTEMS

RELATED APPLICATIONS

This application is a continuation in part of application Ser. No. 09/568,921, entitled Method And Apparatus For Multi-User Resource Management In Wireless Communication Systems filed May 11, 2000, now issued as U.S. Pat. No. 6,519,462.

The disclosed invention is related to U.S. patent application Ser. No. 09/568,666, filed concurrently herewith, entitled "Method And Apparatus For Multi-Layer Resource Management In Wireless Communication Systems" (designated Lu 5-6-6) which is assigned to the same assignee and is incorporated herein by reference.

FIELD OF THE INVENTION

This invention relates to wireless communication systems and, more particularly, to the management of user admission as a function of system loading.

BACKGROUND OF THE INVENTION

Wireless communication systems allow the transmission of information signals between a mobile user and a fixed based station. The base station will typically be interconnected with one or more landline communications networks. Both analog (first generation) and digital (second/third generation) systems have been developed to transmit information signals over communication channels linking the mobile user with landline networks. Digital methods tend to afford several advantages over analog systems, including improved immunity to channel noise and interference, increased capacity, and encryption for secure communications.

First generation wireless systems were primarily directed to voice communication, but the digital technology of second and third-generation systems provides support for both voice and data applications. Several modulation/coding arrangements have been developed, such as frequency division multiple access (FDMA), time division multiple access (TDMA) and code division multiple access (CDMA), to increase the number of users that can access a wireless network. CDMA systems are more immune to multi-path distortion and co-channel interference than FDMA and TDMA systems and reduce the burden of frequency/channel planning that is common with FDMA and TDMA systems.

The base stations of a wireless network manage a variety of resources in the establishment of communications links with their associated mobile users. Among those resources are output power and data rate. Output power and data rate are proportionally related—the output power necessary to establish or maintain a link with a user increasing as the data rate increases. This increase in output power with increasing data rate is required to maintain the output energy per bit at a constant level. In the management of power output, a base station must balance the transmission needs of its users, individually and collectively, against inter-channel interference among the served mobile users, as well as constraints in respect to total output power for the base station.

Thus, upon a request for entry to the wireless network by a user, the base station must evaluate the user's data rate and power demands against the current user environment and power demands. As the user environment approaches the total system capacity, the base station may delay the entry of a user onto the system to prevent overloading the output power capability of the base station.

In a communications system utilizing power control, the allocation of the available RF power is usually dictated by a required Frame Error Rate (FER), with the power control system having a feedback mechanism for adjusting power to maintain the required FER under varying channel conditions. Thus, for a given required FER, the output power will vary depending on the difference between the required FER and the FER experienced due to the channel. The instantaneous Eb/Io ratio (essentially, the digital signal-to-noise ratio) for the channel is controlled by the excursion around that set point in the inner loop of the power control system. Once a target FER is set, the power control system operates to dynamically allocate the RF power to overcome channel fades and interference in order to maintain the experienced FER within a tolerable deviation from the required FER.

For voice calls, FERs are usually set between 1% and 2% to meet a required Merit of Service (MoS) parameter. Data communication applications, on the other hand, can generally accept a somewhat higher FER, but the selected FER must satisfy Quality of Service criteria for such applications. There is a need to provide an efficient allocation of wireless system resources among a variety of users and user application requirements along with an admission procedure for new users.

SUMMARY OF THE INVENTION

A method is provided for intelligent utilization of the power and system resources in a wireless communication system in respect to an allocation of such resources to and among a plurality of users. In particular, the invention provides dynamic allocation of power and system resources in proportion to user application requirements such as to achieve optimum resource allocation in a wireless system.

The methodology of the invention operates to determine an allocation of wireless transmission resources to each user application served by the wireless system in a manner to optimize transmission resources while meeting required QoS criteria for the served user application. After all user applications have been provided a transmission resource allocation in this manner, the total allocation of transmission resources is determined and compared with a ceiling transmission resource level for the wireless system. A portion of the difference between the ceiling and currently allocated transmission resource levels is then made available, according to the method of the invention, to the served user applications in proportion to the initial allocation provided each user application.

In a preferred embodiment of the invention, the determination of an initial optimum resource allocation for each user application is performed in accordance with the multi-layer resource management methodology disclosed in the companion cross-referenced application Ser. No. 09/568,666, designated Lu 5-6-6. According to that methodology, performance characteristics for a user application under consideration and of the wireless channel are determined and stored in the form of a set of tables or corresponding curves (or mathematical equivalents thereof). Data points on those curves are then determined which correspond with a required performance parameter for the user application under consideration (e.g., data throughput). Those data points from the application performance characteristic curves are then mapped to corresponding data points on performance characteristic curves for the physical channel.

From that mapping, an FER and a data rate are selected to optimize system power allocation in respect to the data throughput requirement for the application and the characteristics of the selected channel.

After the resource allocation for each user in the system is determined according to a procedure such as that just described, the total resource allocation for all users is determined—that total allocation representing radio resource utilization for the wireless system. That total resource allocation is then compared with the maximum radio transmission resource available for the wireless system and a portion of the difference between those values is established for use in a "bonus" distribution process. The bonus distribution process operates to distribute the available resource loading "credit" to minimize inter-user interference for a maximized aggregated throughput in the system.

With the bonus process of the invention, the available resource loading remaining after making resource allocations directed to achieving required FER/QoS requirements for served users will be distributed to the users in proportion to their initial allocations, thereby increasing utilization for a system that is not fully loaded. A user receiving a bonus resource allocation pursuant to this procedure will be allocated increased transmission power, which will enable the completion of the transmission for a given data file at an earlier time, thereby making system resources available for another user application during that freed-up time increment.

In a further embodiment on the invention, an admission control methodology is provided in a cooperative relationship with the resource allocation and bonus distribution processes described above.

DETAILED DESCRIPTION OF THE INVENTION

In wireless networks supporting relatively high data rate data communications applications, channel utilization must be carefully managed to avoid delays in transmission caused by inefficient channel utilization. As shown hereafter, the invention provides a novel methodology to manage the communication channel so as to achieve an optimal utilization of wireless system resources. Although the invention is described in terms of a preferred embodiment based on CDMA encoding of the wireless signals, it should be apparent that the methodology of the invention can also be applied for other wireless channelization arrangements, including Wideband CDMA (W-CDMA), TDMA and GSM.

The invention provides a methodology for maximizing radio channel utilization in a wireless system when the wireless system is not fully loaded. With the increased channel utilization realized through the process of the invention, a maximum system aggregate throughput is realized for the users of the wireless system. In particular, the invention determines the differential between the maximum transmission resource availability for a wireless system and the transmission resource level allocated to users served by the wireless system at a given time, and provides a portion of that transmission resource differential for making an additional resource allocation to some or all of the system users. This additional resource allocation process is characterized herein as a "bonus" distribution process. The bonus distribution process operates to redistribute a selected portion of the transmission resource differential (hereafter, sometimes characterized as the "loading credit") among the served users, generally in proportion to an initial resource allocation for each user.

As a first step in the process of the invention, an initial transmission resource allocation is made for each user application served by the wireless system, that initial allocation being generally directed to achieving a required QoS criteria for the user application and a minimum expenditure of system transmission resources. For a preferred embodiment of the invention, this initial resource allocation for each user will be performed in accordance with the multi-layer resource management methodology disclosed in the companion cross-referenced application Ser. No. 09/568,666, designated Lu 5-6-6. Although that process is fully described in the companion cross-referenced application, and reference is made thereto for details of that process, the essential steps of the process are briefly described below. It should, however, be understood that the process of the invention as described herein is not limited to this preferred method for establishing an initial resource allocation for each user. While the process of the invention is believed to accomplish a particularly efficient utilization of wireless system resources in cooperation with the preferred initial allocation method, the inventive process can in fact be applied with any method for making such an initial resource allocation.

In providing the initial resource allocation for a given user application according to the preferred allocation method, a performance parameter which is to be met by the user application, e.g., data throughput, is evaluated relative to a set of performance characteristic curves (or tables) related to the application layer (of a layered protocol model for the communications channel). For the preferred embodiment, those performance characteristic curves will describe data throughput and frame-error-rate characteristics. For a given channel condition, multiple curves, each corresponding to a data rate supported by the wireless system, will be plotted. [Note that the data points from which such characteristic curves are plotted are known, or at least computable, prior to transmission of a data file for the application under consideration.] Therefore, for a given required data throughput for a user application under consideration and a specified channel condition corresponding to the selected performance characteristic curves, that data throughput will in most cases be achieved at multiple data rates. Accordingly, multiple pairs of {FER, data rate} data points may be selected as corresponding to the required data throughput.

A second set of performance characteristic curves (or tables) related to the physical layer (channel) is also determined and the allocation method operates to map data points corresponding to the required throughput from the application-layer performance curves to the physical layer performance curves. For the preferred embodiment, the physical-layer performance characteristic curves are described in terms of FER and Eb/No performance characteristics. As is known, transmission power for a channel is a function of the Eb/No parameter, and thus such a set of performance characteristic curves is also related to the output power for the channel. These FER—Eb/No characteristic curves are derived from channel information such as Doppler frequency, Rician K factor, channel delay profile and other channel fading parameters.

As with the application-layer characteristic curves, for a given channel condition, there are also multiple curves corresponding to different data rates available in the physical layer. And, like the application-layer curves, these physical-layer characteristic curves can be derived based on general channel conditions and independent of any particular data transmission from the application layer. Thus, the {FER, data rate} data points selected from the application (TCP/ RLP) performance characteristic curves may be mapped to corresponding points on these physical-channel performance characteristic curves. From that mapping, a data rate and Eb/Io parameter set can be selected which satisfies the user-application data throughput criteria with minimal resource allocation for the wireless system. It is to be noted that, for the preferred embodiment, the allocation for a given user will be expressed in terms of a data rate and a target FER. Those parameters will, in turn, be translated by the wireless system, according to known methods, to a required transmission power level needed to maintain the target FER at the selected data rate.

A resource allocation for each user in the system is determined according to a procedure such as that just described. Those allocations are then provided to the served users and an initial operation of the wireless system at those allocation levels is begun. In the next step of the method of the invention, the total transmission power needed to maintain the user allocations determined in the preceding step is measured and compared with a maximum transmission power level for the wireless system providing those allocated transmission resources. A differential between that maximum transmission power level and the measured transmission power needed to maintain the initial user allocations is determined, and a portion of that differential, the "loading credit," is then made available for a distribution of additional resource allocations to the served users.

The bonus distribution process of the invention is described hereafter in the context of reverse-link power allocation, but it should be clear that the process may also be implemented for the forward link. The reverse link total received power (RSSI) at a base station is related to the loading and can be used to estimate the system load for the served area. For each antenna of a wireless system under consideration, the base station will obtain a measurement of RSSI from an average of n samples of the total received power that are measured during a predetermined sampling interval—sample size n being chosen by the system operator based on operational and engineering considerations. The set of the measurements collected during the sampling interval is then sorted around a local median value—that median value being determined by computing the cumulative density function (CDF) for the sampled values and selecting the value where the CDF is 50 percent. Hereafter that local median is designated RSSI_proc. [Note that the randomness of the measured RSSI signals creates difficulty in a direct use of the RSSI median value. Use of the local median as described above, operates to smooth the RSSI signal.]

Figure 1:
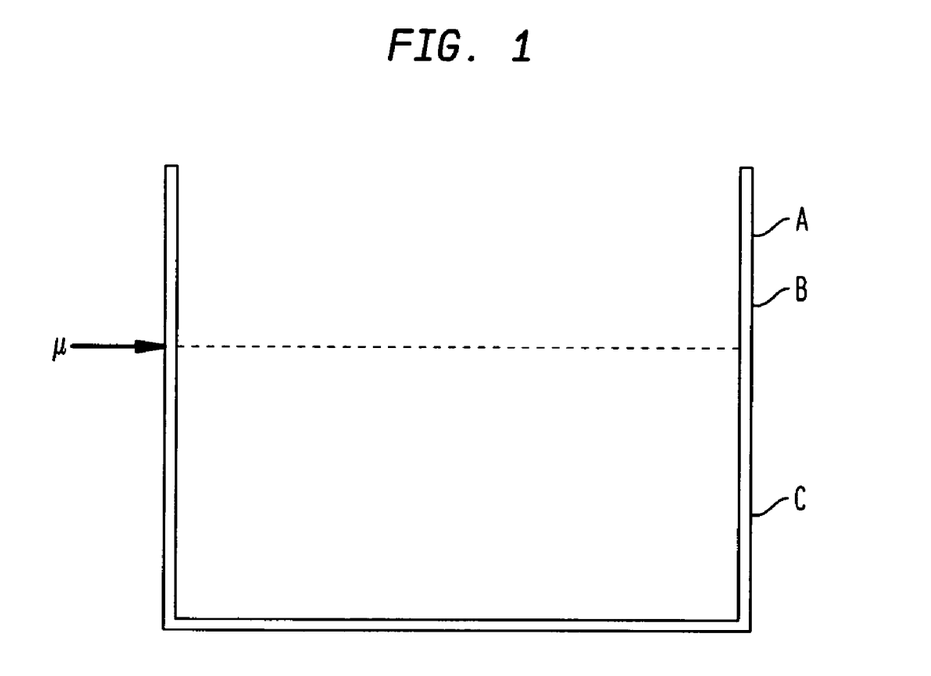
FIG. 1 illustrates a loading bin and associated base station loading factor thresholds according to the methodology of the invention.

In the implementation of the process of the invention, a loading bin associated with thresholds is first described. That loading bin is intended to provide a conceptual measure of the loading condition at a base station. A parameter $\mu$, representing a current base station loading in percent, is defined as follows:

$$\mu = \frac{\sum S_i(1+\beta)}{S_{max}}$$

where $S_i$ is the received signal strength for the ith user at a base station, $\beta$ is a factor representing interference from other cells, $\epsilon S_i(1+\beta)$ represents the total received signal strength, which is determined by RSSI_proc, as described above. $S_{max}$ is a reference point corresponding to maximum signal strength for the wireless system. Thus, $\mu=1$ corresponds to the maximum loading in an ideal case. Three thresholds are defined with respect to $\mu$. These thresholds, along with the loading bin of the invention are illustrated in FIG. 1. With reference to the figure, those thresholds are defined as follows:

A—threshold representing maximum load allowed for the base station in actual operation, as established in a system specification; a next user request for service will be denied if this limit is exceeded;

B—an upper threshold representing a point above which no bonus distribution will be processed; [Note that the distance between the A and B thresholds is empirically determined by the system operator, and is a function of the quantum steps of the transmission power, which is in turn a function of the quantum steps of the data rate, FER and the channel fading function.]

C—a lower threshold, representing a point below which the bonus distribution process will be initiated; although the bonus distribution process will not be started above threshold level C, it can be maintained as $\mu$ moves into the range between threshold levels C and B. [Note that the differential between threshold levels B and C is empirically determined by the system operator and is dependent on the channel fading variance and the interference level.]

Figure 2:
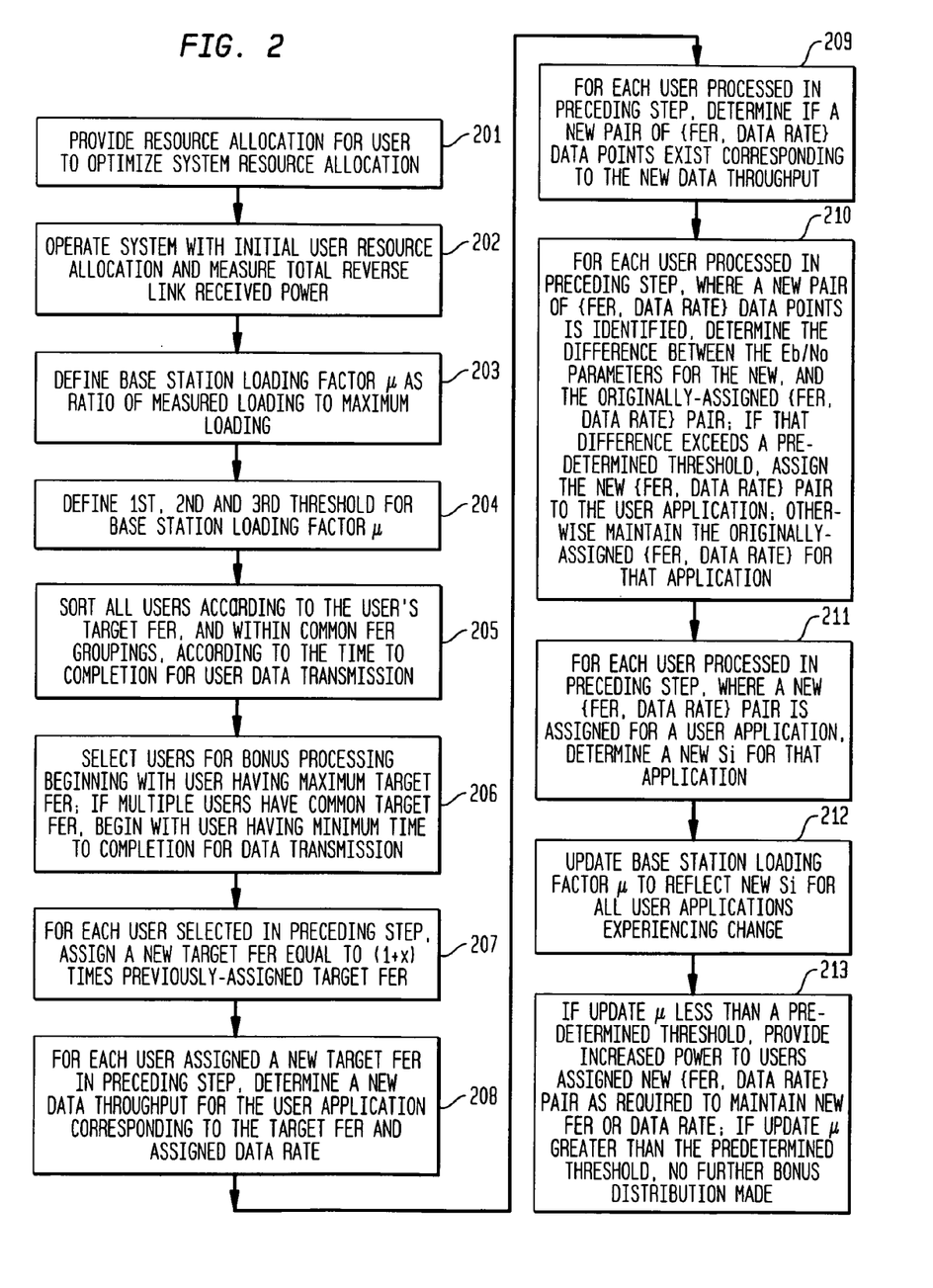
FIG. 2 provides a flowchart in respect to the bonus distribution process of the invention.

The remaining steps of the methodology of the invention may be better understood with reference to the flow chart of FIG. 2. As will be seen from the figure, steps 201, 202, 203 and 204 correspond respectively to the previously described steps of (1) providing an initial resource allocation for a served user (that allocation being preferably established to optimize system resource allocation), (2) operating the wireless system at the initial resource allocation levels and measuring total reverse-link received power, (3) establishing a base station loading factor, and (4) defining a set of thresholds in respect to that base station loading factor.

The method of the invention then proceeds, at step 205, to a sorting of the users into a set {$FER_i$} and a subset {$T_i$}, where $FER_i$ represents the target FER for the ith user application, and $T_i$ is the time required from the present to the completion of the ith user's data transmission. The {$FER_i$} set is sorted according to increasing or decreasing FERs, and, where a given target FER is common to multiple users, those common FERs are sorted according to increasing or decreasing user $T_i$s. In step 206, each user application is evaluated for bonus distribution, and in a preferred embodiment, that evaluation begins with the user having the maximum target FER, and continues through successively lesser target FERs. For the case of multiple users having a common target FER, the users in such a group are processed in order of increasing time for completion, $T_i$s, of the user's data transmission.

For each user evaluated for bonus distribution in step 206, the invention proceeds, at step 207, to assign a new target FER for the user, where the new target FER is determined as a product of the initially allocated target FER and a factor of (1+x)—x representing a small fraction chosen by the system operator to be less than the fraction of maximum system loading represented by the "loading credit." In a preferred embodiment of the invention, x will be chosen as much smaller than the "loading credit" fraction, and the bonus distribution process recursively continued with increasing values of x until the base station loading factor, $\mu$, reaches the upper threshold of the loading bin. [Note that the actual value of "x" is empirically determined by the system operator, and practically represents a tradeoff between resolution and required processing resources—i.e., if "x" is small, resolution is good, but the algorithm takes many steps to converge.]

In step 208, a new data throughput is determined for each new target FER assigned in the preceding step, and, in step 209, that new data throughput is evaluated against the application performance characteristic curves to determine if a new pair of {FER, data rate} data points exist which correspond to that new throughput. For each user where such a new pair of {FER, data rate} data points are found, in step 210 those new data points are mapped to the physical channel performance characteristic curves, and an Eb/No parameter corresponding to the mapped new data-point pair is determined. A difference is then determined between the Eb/No parameter corresponding to the initially allocated {FER, data rate} pair and that of the newly-mapped pair, and that difference is compared to a predetermined threshold. If the Eb/No difference exceeds that threshold, the new {FER, data rate} pair is assigned to the user application. However, if the Eb/No difference is less than the threshold amount, no change is made and the user application retains the initial allocation. In all cases where a new {FER, data rate} pair is assigned to a user application in the preceding step, a new $S_i$ is determined for the user application, at step 211. The base station loading factor, $\mu$, is then updated at step 212 to reflect the new $S_i$ for all user applications which are provided a new resource allocation.

The updated loading factor, $\mu$, is compared with the upper threshold B of the loading bin at step 213. If $\mu$ is less than threshold level B, the additional, i.e., bonus, resource allocations identified in the preceding steps may be distributed to the qualifying user applications. The distribution will normally be implemented via a message to the mobile unit for a given user application authorizing the mobile to increase its output power to maintain the new FER and/or data rate corresponding to the additional resource allocation. However, if the updated 1 is greater than the upper threshold level B, no additional bonus distribution can be made, and the bonus distribution process stops.

The bonus distribution process provided according to the heretofore described method of the invention operates to increase utilization for a system that is not fully loaded after the conclusion of an allocation process directed to achieving required FER/QoS criteria for served users. Using the method of the invention, the remaining available loading will be distributed to the system users, resulting in a bonus resource allocation of increased transmission power for users. With this bonus allocation, the users are able to complete the transmission of a given data file an earlier time, thereby making system resources available for other user applications during those freed-up time increments.

In a further embodiment of the invention, an admission control method is provided to address requests for admission to the wireless system for new users, and to cooperatively evaluate resource requirements for such a new user with the resource allocation and a bonus distribution methods heretofore disclosed. As with the bonus distribution methodology, for a preferred embodiment, the admission control method is described in the context of reverse-link power allocation, but it should be clear that the process may also be implemented for the forward link.

The admission control method of this further embodiment is characterized in terms of the loading bin heretofore described in connection with the bonus distribution process, as illustrated in FIG. 2, along with a job-priority queue. Such a job priority queue records access request information from mobiles seeking admission to the wireless system in a parallel-access buffer, so that the processing order of admission requests from various mobiles can change arbitrarily. The output admission request order may be based on request arrival time, or may be determined through additional scheduling procedures.

Figure 3:
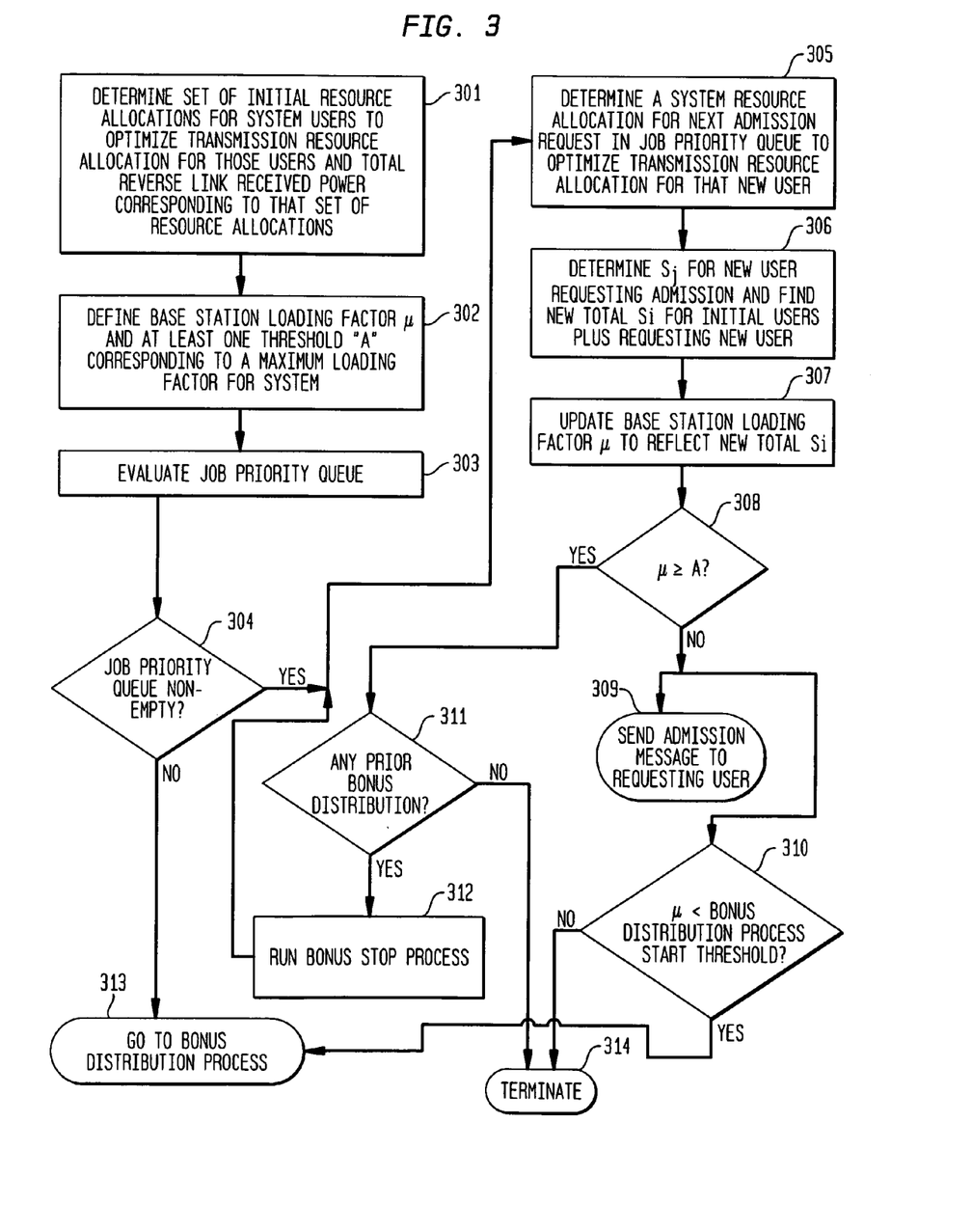
FIG. 3 provides a flowchart in respect to the admission control process of the invention.

The steps of the admission control method are illustrated in the flowchart of FIG. 3, and will be described hereafter with reference to that figure. The methodology begins, at step 301, with the determination of the initial setup resource allocations for user applications in the wireless transmission system, and preferably with the initial resource allocation process operating to optimize the transmission resource allocation for those user applications. From that initial set of user resource allocations, a determination is made of the corresponding reverse-link received power for that set of user applications. As should be apparent, this step corresponds substantially to steps 201 and 202 of FIG. 2 (the flowchart for the bonus distribution process). And, similarly to steps 203 and 204 of FIG. 2, step 302 of the admission control method establishes a base-station loading factor, $\mu$, and a threshold representing an upper limit on that loading factor—i.e., a point of maximum loading for the system. Note that, whereas the bonus distribution process depicted in FIG. 2 contemplates multiple loading-factor thresholds, only a single loading-factor threshold is required for the admission control method, that single loading-factor threshold preferably corresponding to the upper threshold, "A," of the bonus distribution process.

At step 303, the job priority queue is evaluated to determine if any mobiles are currently seeking admission to the system. In the event that no mobiles are currently seeking admission—i.e., the job priority queue is empty, the process is directed, at decision step 304, to the bonus distribution process. (In the event that the wireless system does not support the bonus distribution process, the process flow in the case of the job priority queue being empty would be directed to the termination step 314 of the admission control method.) On the other hand, if at least one mobile seeking admission is found in the job priority queue, the process is directed, at decision step 304, to a process step, 305, where a determination is made of a resource allocation needed to address QoS requirements for the user application at the mobile seeking admission. As with the resource allocations for the initial set of system users at step 301, it is preferred that the resource allocation process operates to optimize the transmission resource allocation for the new user application.

The received signal strength, $S_j$, for the new user requesting admission is then computed, in step 306, based on the resource allocation determined for that user in step 305. $S_j$, can be computed from the following equation:

$$S_j = (1/g) \cdot (Eb/No) \cdot \left(F \cdot N_{th} \cdot W + \sum S_i \cdot (1+\beta)\right)$$

where
  g is processing gain
  F is base station noise figure
  $N_{th}$ is thermal noise
  W is total bandwidth It should, of course, be understood that other methods for computing $S_j$, as known to those skilled in the art, could also be applied here, the suggested equation only representing a preferred embodiment. Once the computed received signal strength for the user requesting admission has been determined, a new total received strength for all users, including the prospective new user, is determined. That new total received strength is then used, at step 307, to determine an updated base-station loading factor, $\mu$.

The updated $\mu$ is then compared with the maximum loading threshold, A, for the system, at decision step 308. If $\mu$ is equal to or greater than A, indicating that the system is already fully loaded, the process is directed to a second decision step, 311, where a determination is made as to whether a bonus distribution has previously been made for the system. If no bonus distribution has previously been made, there is no further opportunity to admit a new user at the present time. The admission request is therefore denied and the process terminates at step 314. However, for the case that a bonus distribution has previously been made, all or a portion of that bonus distribution can be reversed to free-up a resource allocation for the user seeking admission. Accordingly, in that case, the process is directed, from decision step 311, to run a bonus stop process at step 312. After the bonus stop process has been run, the user admission request is directed back to step 305 for another try at admitting the user. In a preferred embodiment, the bonus stop process will reverse only a most recent recursion of the bonus distribution process, with the sequence from a step 305 through step 312 being repeated (and further bonus-distribution recursions reversed) until a sufficient resource allocation has been made available to admit the new user.

Returning to decision step 308, if $\mu$ is less than A, indicating an availability of loading headroom in the system sufficient to accommodate the new user, the new user will be admitted and a message confirming that admission will be sent to the mobile associated with that user, at step 309. Concurrently, updated loading factor $\mu$ is also compared with the bonus distribution start threshold (for systems incorporating the bonus distribution process) in step 310. If the updated $\mu$ is below the bonus-distribution start threshold (i.e., threshold C in the heretofore described bonus distribution process), the process is directed, at step 313, to the beginning of the bonus distribution process. Otherwise, the process terminates at step 314.

As should be apparent from the preceding description of the admission control process, the process is closely related to the bonus distribution process and utilizes some of the same performance parameters as applied there. It should also be apparent that the admission control process may either precede or follow the bonus distribution process, as well as be implemented in a synergistic parallel operation with the bonus distribution process.

The method of the invention may be implemented in a "processor" that is capable of configuring the communication channel and is linked with a memory. In this embodiment, the memory will contain tables that characterize the performance characteristics curves and the physical layer characteristics curves. The processor will monitor the communication channel, interact with user applications, and carry out the data gathering and processing tasks described hereinbefore for the method of the invention The functions performed by the processor may be provided through the use of either shared or dedicated hardware, including, but not limited to, hardware capable of executing software. Use of the term "processor" should not be construed to refer exclusively to hardware capable of executing software. Illustrative embodiments of the processor may comprise microprocessor and/or digital signal processor ("DSP") hardware, read-only memory ("ROM") for storing software for performing the operations discussed below, and random access memory ("RAM") for storing results. Very large scale integration ("VLSI") hardware embodiments, as well as custom VLSI circuitry in combination with a general purpose DSP circuit, may also be provided.

CONCLUSION

The invention provides a novel method for dynamically allocating system resources in order to achieve maximum data throughput for a wireless system and optimal efficiency in the allocation of system resources. The method dynamically adjusts a frame error rate (FER), data rate or other application-resource parameter to utilize a loading credit for a wireless system to achieve such throughput and resource-utilization optimization. The invention also provides an admission control process which may be implemented cooperatively with the process of allocating the loading credit.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed is:

1. In a wireless communication system having a transmitter and at least one receiver coupled via a communication channel and operable to provide a communications path for at least one user application, a method of admission control for a user requesting access to said communication system comprising the steps of:
  determining an allocation of system resources required to provide a predetermined level of service for a set of user applications theretofore admitted to said communication system, wherein system loading corresponding to said allocated system resources is specified in terms of a loading factor;
  determining a maximum loading for said system, said maximum loading being designated as a loading factor threshold;
  in response to an access request from a new user, determining an initial allocation of system resources needed to provide a specified level of service for said new user;
  computing a loading factor corresponding to system loading for system resources required for said theretofore admitted users in combination with system resources to be allocated to said new user;
  comparing said computed loading factor with said loading factor threshold and making an admission decision for said user requesting access based on a relationship between said computed loading factor and said loading factor threshold;
  wherein the step of determining an initial allocation of system resources further includes the substeps of:
  determining a first and a second set of performance characteristic curves based on predetermined channel condition information in respect to said communications path, said first set of performance characteristic curves being determined in respect to a user application of said requesting user and said second set of performance characteristic curves being determined in respect to a physical channel for said communications path;

determining a QOS requirement for said user application;

determining a set of data pairs on said first set of performance characteristic curves that correspond to said QOS requirement;

mapping said determined set of data pairs on said first set of performance characteristic curves to a corresponding set of data pairs on said second set of performance characteristic curves, each said mapped data pair on said second set of performance characteristic curves being functionally related to a transmission power level in said communications channel;

from said mapped data pairs on said second set of performance characteristic curves, selecting a pair corresponding to a lower transmission power level in said communications channel.

2. The admission control method of claim 1 wherein a decision is made to admit said user requesting access to said wireless communication system when said computed loading factor is less than said loading factor threshold.

3. The admission control method of claim 1 wherein a determination in said admission decision step that said computed loading factor is greater than or equal to said loading factor threshold results in the further steps of:

determining whether a total resource allocation for users theretofore admitted to said wireless communication system includes an allocation over and above that required to meet service requirements for said theretofore-admitted users; and upon making such a determination, initiating a process to reverse at least a portion of said resource allocation over and above that required to meet service requirements.

4. The admission control method of claim 3 wherein, upon completion of said process to reverse at least a portion of said resource allocation, said steps of computing a loading factor and making an admission decision are repeated.

5. The admission control method of claim 1 wherein a decision to admit said user requesting access to said wireless communication system results in the further steps of:

determining a difference between said maximum loading for said wireless system and a loading of said system required to accommodate resource allocations for users theretofore admitted to said wireless communication system and said system resource allocation determined for said user requesting access;

selecting a portion of said loading difference for further allocation among user applications served by said system;

providing a subset of said served user applications with a further resource allocation from said selected portion of said loading difference.

6. The admission control method of claim 5 wherein said step of providing a subset of said served user applications with a further resource allocation includes the substeps of:

selecting ones of said user applications for evaluation according to a target frame error rate (FER) assigned for each said user application during said allocation of system resources required to provide a predetermined level of service;

computing a revised target FER for each said selected user application as a defined percentage increase over said initially allocated target FER;

determining a difference between a transmission resource parameter associated with said revised target FER and a corresponding transmission resource parameter for said initially allocated target FER, and comparing said difference with a predetermined threshold;

where said difference exceeds said threshold, allocating said revised target FER to said user application.

7. The admission control method of claim 1 wherein said step of determining an allocation of system resources required to provide a predetermined level of service operates to meet a required Quality of Service (QoS) criteria for a given user application with minimal allocated system transmission resources.

8. The admission control method of claim 1 wherein said QOS requirement is specified in terms of a minimum throughput for data transmitted from said user application.

9. The admission control method of claim 1 wherein said system loading is determined by measurement of total reverse-link received power for said wireless communication system.

10. The admission control method of claim 1 wherein said step of determining an allocation of resources to address a service requirement of said user requesting access operates to meet a required Quality of Service (QoS) criteria for a user application associated with said user requesting access.

11. In a wireless communication system having a transmitter and at least one receiver coupled via a communication channel and operable to provide a communications path for at least one user application, an apparatus for controlling admission control for users requesting access to said communication system comprising:

processing means established to determine an allocation of system resources required to provide a predetermined level of service for a set of user applications theretofore admitted to said communication system, wherein system loading corresponding to said allocated system resources is specified in terms of a loading factor;

means for determining an initial allocation of system resources needed to provide a specified level of service for a new user, in response to an access request from said new user;

computing means established to compute a loading factor corresponding to system loading for system resources required for said theretofore admitted users in combination with system resources to be allocated to said new user;

processing means established to compare said computed loading factor with a loading factor threshold established in relation to a maximum signal load for said system, and to determine an admission decision for said user requesting access based on a relationship between said computed loading factor and said loading factor threshold;

wherein said means for determining an initial allocation of system resources further comprises:

a memory means established to store a first and a second set of performance characteristic curves, said curves being determined as a function of channel condition information in respect to said communications path, said first set of performance characteristic curves being determined in respect to a user application of said requesting user and said second set of performance characteristic curves being determined in respect to a physical channel for said communications path;

means to determine a Quality of Service (QOS) requirement for said user application;

means to determine a set of data pairs on said first set of performance characteristic curves that correspond to said QOS requirement;

mapping means for mapping said determined set of data pairs on said first set of performance characteristic curves to a corresponding set of data pairs on said second set of performance characteristic curves, wherein each said mapped data pair on said second set of performance characteristic curves is functionally related to a transmission power level in said communications channel;

selection means operative to identify and select a one of said mapped data pairs on said second set of performance characteristic curves corresponding to a lower transmission power level in said communications channel.

12. The admission control apparatus of claim 11 wherein said determination of an admission decision is based on a determination of said computed loading factor being less than said loading factor threshold.

13. The admission control apparatus of claim 11 further comprises:

processing means established to determine a difference between said maximum loading for said wireless system and a loading of said system required to accommodate resource allocations for users theretofore admitted to said wireless communication system and said system resource allocation determined for said user requesting access;

processing means established to select a portion of said loading difference for further allocation among user applications served by said system;

means for providing a subset of said served user applications with a further resource allocation from said selected portion of said loading difference.

14. The admission control apparatus of claim 13 further comprising:

processing means established to select ones of said user applications for evaluation according to a target frame error rate (FER) assigned for each said user application during said allocation of system resources required to provide a predetermined level of service;

computing means established to compute a revised target FER for each said selected user application as a defined percentage increase over said initially allocated target FER;

comparison means for determining a difference between a transmission resource parameter associated with said revised target FER and a corresponding transmission resource parameter for said initially allocated target FER, and comparing said difference with a predetermined threshold;

loading means for allocating said revised target FER to said user application when said difference exceeds said threshold.

15. The admission control apparatus of claim 11 wherein said processing means established to determine an allocation of system resources required to provide a predetermined level of service operates to determine an initial allocation that meets a required QoS criteria for a given user application with minimal allocated system transmission resources.

16. The admission control apparatus of claim 1 wherein said QOS requirement is specified in terms of a minimum throughput for data transmitted from said user application.

17. The admission control apparatus of claim 11 further including means for measurement of total reverse-link received power for said wireless communication system, said measurement being applied for a determination of said system loading.

* * * * *